United States Patent Office 3,579,590
Patented May 18, 1971

3,579,590
METHOD OF PREPARING DIARYL SULFONES
David S. Davis, West Orange, N.J., assignor to Witco Chemical Corporation, New York, N.Y.
No Drawing. Filed Dec. 12, 1967, Ser. No. 689,809
Int. Cl. C07c 147/06
U.S. Cl. 260—607                                       5 Claims

ABSTRACT OF THE DISCLOSURE

Production of diaryl sulfones having the formula

R—SO$_2$—R by reacting in admixture (a) aryl compounds having the formula RH wherein R represents an aryl hydrocarbon such as benezne or naphthalene in which the nuclear carbon atoms have their outer valences satisfied by hydrogen or one or more of alkyl (including cycloalkyl), alkoxy, thioalkyl, halogen, phenyl, substituted phenyl, phenoxy, and substituted phenoxy groups and mixtures thereof (b) anhydrous sulfonating agents as, for instance, fluorosulfonic acid, sulfur trioxide, chlorosulfonic acid and mixtures thereof, and (c) at least 0.04 mole of a non-metallic condensing agent for instance, P$_2$O$_5$, phosphorus pentachloride, phosphorus oxychloride, and boric anhydride, per mole of sulfonating agent, said diaryl sulfones being produced in high yield and having a high degree of purity, free from metallic impurities.

---

The present invention relates to an improved method of preparing diaryl sulfones.

Diaryl sulfones have heretofore been prepared by various methods such as reacting aryl sulfonyl halides with aryl hydrocarbons in the presence of metal salts that serve as condensing agents or Friedel-Crafts catalysts, as disclosed, for instance, in U.S. Pat. Nos. 2,224,946; 2,781,-402; 3,057,952; 3,060,193; and 3,125,604; or in the presence of a variety of non-metallic compounds that serve as condensing agents as disclosed, for instance, in U.S. Pat. Nos. 2,768,211; 3,045,050 and 3,125,604. It is also known to use a variety of sulfonating agents and other reactants as disclosed, for instance, in U.S. Pats. Nos. 2,768,211 and 3,045,050. However, when metal-containing compounds are employed, trace amounts of these metals in the diaryl sulfone products make said sulfone products unsuitable for certain uses, as for instance, monomers for plastics. Furthermore, generally speaking, these known methods require the use of complicated and expensive processes or starting materials and yields are unsatisfactory. It has also been heretofore suggested to prepare diaryl sulfones by sulfonating with sulfuric acid 1 mole of an aryl compound, such as monochlorobenzene or benzene, in the presence of 0.33 mole of POCl$_3$, but the yields of the corresponding diaryl sulfones are disappointingly low, being about 15% of 4,4'-dichlorodiphenyl sulfone and about 21% of diphenyl sulfone.

In accordance with the present invention, it has now been found that diaryl sulfones of a high degree of purity and substantially free from metal contamination can be readily prepared by a liquid phase method which comprises reacting:

(a) Aryl compounds having the formula RH wherein R represents an aryl hydrocarbon, including benzenoids, in which the nuclear carbon atoms have this outer valences satisfied by hydrogen or substituents as, for instance, alkyl, (including cycloalkyl), alkoxy, thioalkyl, halogen, phenyl, substituted phenyl, phenoxy, substituted phenoxy, and, in the case of polynuclear aryl hydrocarbons, nitro substituents therein as well, and (b) An essentially anhydrous sulfonating agent, said reaction being carried out in the presence of (c) At least about 0.04 mole of non-metallic condensing or dehydrating agent per mole of said sulfonating agent. The high yields of diaryl sulfones having a high degree of purity resulting from the practice of the present invention are surprising, considering the simplicity of the procedure and small amount of condensing agent compared to other commercial methods that involve the use of more complex and expensive procedures and materials.

In carrying out the method of the present invention, the sulfonating agent can be added to an admixture of the aryl compound and non-metallic condensing agent, or the non-metallic condensing agent can be added concurrently with the sulfonating agent or admixed with sulfonating agent. The reaction batch is generally heated to increase the rate of sulfone formation. It may be desirable to heat the reaction vessel during the mixing of the various above noted ingredients though, when activated aryl compounds as, for instance, xylene, or naphthalene are to be employed in the reaction, it is most advantageous to heat the reactants only after all the ingredients have been admixed. Heating of the reaction batch is continued until the reaction is complete. In general, it is most advantageous to carry out the reaction at elevated temperatures under reflux conditions, but, any reaction temperature below the temperature at which the sulfone decomposes, including room temperature, can be used. Separation of the sulfone product generally can be readily accomplished by cooling the reaction mass to less than about 100 degrees C., adding water to the reaction mass, distilling off any unreacted aryl compound, refluxing the batch for about an hour, cooling, filtering and then drying the precipitate which is the sulfone product. Recrystallization of the crude sulfone product to further purify the same, if desired, can be carried out in any of a number of ways well known in the art. One of the surprising advantages in producing sulfones in accordance with the practice of the present invention is the high purity of the sulfone product so produced particularly with respect to absence or substantial absence of metallic contaminants which makes it suitable for numerous applications without the requirement for any further purification.

So far as we are aware, no other liquid phase procedure is known in the art whereby diaryl sulfones may be produced in high yields and high degree of purity, essentially free of metallic contaminants, by a one-step, one-temperature reaction. Furthermore, the flexibility of reaction temperatures possible in carrying out the method of the present invention makes it possible to employ certain reactants that may normally be solids at low temperature without the need for dissolving in separate solvents prior to incorporation in the reaction batch since the reaction can be carried out at temperatures high enough to melt the reactants.

As stated above, in accordance with our invention, aryl compounds having the general formula RH wherein R is as hereinabove defined are reacted with sulfonating agents in the presence of a non-metallic condensing agent. The choice of particular aryl compounds or mixtures thereof is, of course, dependent upon the diaryl sulfone product desired. We have found that diaryl compounds of the general formula RH as above defined readily lend themselves to conversion into diaryl sulfones of the general formula R—SO$_2$—R wherein R is as above defined.

Illustrative examples of aryl compounds that are suitable for use in the practice of our invention include benzene, naphthalene, anthracene which contain at least one hydrogen atom attached to the nucleus and which may contain one or more substituent groups which can be alkyl, alkoxy, thioalkyl, halogen, phenyl, substituted phenyl, phenoxy, substituted phenoxy, the substituents in the phenyl and phenoxy groups including, for instance, alkyl, alkoxy, thioalkyl and halogen. In the case of polynuclear aryl hydrocarbons, the substituents may also include nitro groups. Especially good results are obtained with benzene and naphthalene or their derivatives carrying from 1 to 3 substituent groups. Among the aryl compounds are, for instance, toluene, xylene, mesitylene, mono-di and tri-ethyl benzenes; mono-, di and tri-isopropylbenzenes; nonylbenzene, dodecyl benzene, tridecyl benzene, cyclohexyl benzene, Tetralin, mono-, di- and tri-methylnaphthalenes; mono-, di- and tri-methylanthracenes; alkoxy derivatives, particularly those containing from 1 to 4 carbon atoms, as, for example, mono-, di- and tri-methoxy benzenes; mono- and di-methoxy toluenes; thiomethyl benzene, thioethyl benzene, thioamyl benzene; mono-, di- and tri-chlorobenzenes; mono-, di- and tri-bromobenzene; mono- and di-chloroanisoles; mono- and di-chlorotoluenes; biphenyl; diphenylether, methyl ether of phenol, ethyl ether of phenol, isopropyl ether of phenol, methyl ether of naphthol, ethyl ether of naphthol, isopropyl ether of naphthol, 4-nitrobiphenyl, and nitro methyl naphthalene. Mixtures of any two or more of such or similar aryl compounds can, of course, be utilized.

Any well known essentially anhydrous sulfonating agent is suitable for use in the practice of our invention but sulfonating agents most suitable and preferred for use are the anhydrous agents such as sulfur trioxide, chlorosulfonic acid, or mixtures thereof.

It is important to the achievement of the results of our invention that suitable non-metallic condensing agents are utilized. The condensing agents or dehydrating agents suitable for use in the method of the present invention can be taken to mean any non-metallic chemical compounds or mixtures of chemical compounds which are efficient in removing water from the reaction zone and do not destroy or cause decomposition of the aryl compound, the sulfonating agent or sulfone product. Illustrative examples thereof are, for instance, $P_2O_5$, polyphosphoric acids; and pentavalent phosphorus halides such as phosphorus pentachloride, -pentabromide, -oxychloride or -oxybromide, phosphorus trichloride and phosphorus tribromide. Especially suitable and preferred is phosphorus oxychloride which is a liquid at ambient temperatures, has a high boiling point, is inexpensive and is miscible with both aryl compounds and sulfonating agents. Other suitable condensing agents are boric anhydride, and thionyl chloride. While the removal of the water of reaction is especially advantageously carried out through the utilization of non-metallic condensing or dehydrating agents as described above, it is within the scope of the broader aspects of the present invention to effect the removal of the water of reaction mechanically or by physical-chemical means, for instance, utilizing molecular sieve materials such as various zeolitic materials.

The ratios of reactants to be employed in the practice of the present invention may be chosen to achieve the greatest economy of raw material cost. Wide latitude is permissible with regard to the quantity of aryl compound and sulfonating agent employed but, generally, it is desirable to use at least about 0.8 mole of aryl compound per mole of sulfonating agent, and a range of between about 1.3 and 1.8 moles of aryl compound for every mole of sulfonating agent is most advantageously employed.

The quantity of condensing agent employed in the practice of the present invention should be controlled in order to obtain high yields of sulfone product. It has been found that at least about 0.04 mole of condensing agent should be employed per mole of sulfonating agent and, while an amount of condensing agent considerably greater than 0.04 mole per mole of sulfonating agent can be utilized, a range of about 0.1 to 0.4 mole of condensing agent per mole of sulfonating agent is generally preferred. Amounts, such as 0.1 to 0.25 mole of condensing agent, which are distinctly less than what constitute stoichiometric proportions, are highly effective in producing improved yields of the desired sulfones. In this connection, it may be noted that in certain prior art processes which have been disclosed for the production of diaryl sulfones, amounts of condensing agents, such as phosphorus oxychloride, have been employed which are as high as of the order of 1 mole for every mole of intermediate sulfonic acid formed in the process. The present invention results in marked economies in the use of such condensing agents over those of such prior processes while, at the same time, as stated above, permitting excellent yields of diaryl sulfones to be obtained which are extremely low in metal or metal salt contaminants.

The following examples are illustrative of the practices of the invention but they are not to be construed as in any way limitative since various modifications can be made in the light of the guiding principles and teachings disclosed herein. All parts given are by weight, and all temperatures recited are in degrees C.

EXAMPLE 1

236 parts (2.1 moles) of monochlorobenzene and 38 parts (0.25 moles) of phosphorus oxychloride were mixed in a flask and heated to approximately 120 degrees. 120 parts (1.5 moles) stabilized sulfur trioxide was then added over a 3 hour period as the temperature rose slowly to 145 degrees. The reaction was held at 150 degrees overnight and then cooled to 90 degrees. One liter of water was added to the flask; the slight excess of monochlorobenzene was distilled off and the precipitate obtained was washed for an additional hour with boiling water. After cooling, filtration, and drying, 177 parts (0.61 moles) of a cream colored solid identified as 4,4'-dichlorodiphenyl sulfone was obtained. The yield was 59% based on the monochlorobenzene consumed.

EXAMPLE 2

Example 1 was repeated except that 177 parts (1.5 moles) of chlorosulfonic acid was used as the sulfonating agent instead of stabilized sulfur trioxide. The yield of 4,4'-dichlorodiphenyl sulfone was 61% based on the monochlorobenzene consumed.

EXAMPLE 3

Example 1 was repeated except that 38 parts of phosphorus oxychloride and 120 parts of stablized sulphur trioxide were admixed prior to addition to the monochlorobenzene. The yield of 4,4'-dichlorodiphenyl sulfone was 58% based on the monochlorobenzene consumed.

EXAMPLE 4

Example 1 was repeated through the period of reaction at 150 degrees. At this point, in accordance with known prior art disclosures, the reaction batch was cooled to about 90 degrees and 40 parts of a Friedel-Crafts agent (anhydrous ferric chloride) were added. The reaction mixture was heated to 150 degrees and held under reflux for 3 hours. The product was isolated by treatment with water as in Example 1. The yield of 4,4'-dichlorodiphenyl sulfone was 56% based on the monochlorobenzene consumed. A comparison of the results of this Example 4 and of Example 1 shows that no improvement of yield results from the Friedel-Crafts treatment, and surprisingly good yields are obtained by the practice of the method of the present invention. Further, analysis of the sulfone product of this Example 4 showed that it contained 160 p.p.m. of iron, whereas the sulfone product of Example 1 was found to have an iron content of only 18 p.p.m.

EXAMPLE 5

185 parts (2.4 moles) of benzene were mixed with 25 parts (0.16 moles) of phosphorus oxychloride with agitation and 123 parts (1.54 moles) of stabilized sulfur trioxide were then added to the mixture. Over a 40 minute period the temperature of the reaction batch rose from 23 degrees to 75 degrees. The reaction batch was then heated to 145 degrees and held under reflux at this temperature overnight. Then the reaction batch was cooled to below 80 degrees, 800 parts of water were added and the slight excess of benzene was distilled off. After additional refluxing with water, the mixture was cooled and the batch was filtered to separate the precipitate. 144 parts (0.66 moles) of diphenyl sulfone was obtained, a yield of 55% based on the benzene consumed.

EXAMPLE 6

Using the procedure of Example 1, 4,4'-dichlorodiphenyl sulfones were prepared using the following reactant proportions:

(A) 1.16 moles of monochlorobenzene were reacted with 1.0 mole of stabilized sulfur trioxide in the presence of 0.125 moles of phosphorus trichloride. A yield of 54% sulfone was obtained based on the monochlorobenzene consumed.

(B) 1.44 moles of monochlorobenzene were reacted with 1.0 mole of stabilized sulfur trioxide in the presence of 0.11 moles of phosphorus pentachloride. A yield of 52% sulfone was obtained based on the monochlorobenzene consumed.

(C) 1.18 moles of monochlorobenzene were reacted with 1.0 mole of stabilized sulfur trioxide in the presence of 0.27 moles of thionyl chloride. A yield of 40% sulfone was obtained based on the monochlorobenzene consumed.

EXAMPLE 7

Example 5 was repeated except that 50.3 parts (0.328 moles) of phosphorus oxychloride were used. 169 parts (0.775 moles) of diphenyl sulfone was obtained, a yield of 65% based on the benzene consumed.

EXAMPLE 8

Example 5 was repeated except that 177 parts (1.5 moles) of chlorosulfonic acid was used as the sulfonating agent instead of stabilized sulfur trioxide. The yield of diphenyl sulfone was 66% based on the benzene consumed.

EXAMPLE 9

As illustrative of a prior art procedure, and for comparative purposes, part (a) was carried out as follows:

(a) 195 parts (2.5 moles) of benzene were sulfonated with 98 parts (1.22 moles) of stabilized sulfur trioxide at a temperature just below 20 degrees. The mixture was agitated for ½ hour at 70 to 80 degrees. 77 parts (0.5 moles) of phosphorus oxychloride were added and the reaction batch was refluxed for 18 hours. The batch temperature rose to about 120 degrees during this period. The reaction batch was cooled to below 100 degrees and 800 parts of water were added. Unreacted benzene was distilled off, and about 40 parts of benzene being collected from this distillation. The reaction batch was agitated for 2 hours while maintaining a temperature between 95 degrees and 100 degrees. The batch was then cooled, filtered and the diphenyl sulfone precipitate that was collected was washed with water. About 0.43 moles of diphenyl sulfone product per mole of sulfonating agent was produced, a yield of about 53% based on the benzene consumed.

By way of contrast and for comparison with the process of part (a), part (b) was carried out in accordance with the present invention.

(b) Using the proportions of ingredients of part (a) of this Example 9, diphenyl sulfone was produced using the procedure of Example 6. It was determined that about 40 parts of benzene was not reacted and was collected during the distillation step. About 0.53 moles of diphenyl sulfone per mole of sulfonating agent was produced, a yield of about 67% based on the benzene consumed.

It is readily apparent by comparing the results of parts (a) and (b) of this Example 9 that the procedure of the present invention involving a simple one-step reaction surprisingly results in improved yields of diaryl sulfones as compared to processes known in the prior art as disclosed, for instance, in U.S. Pat. No. 3,125,604.

EXAMPLE 10

345 parts (2.7 moles) of naphthalene were mixed with 41.5 parts (0.27 moles) of phosphorus oxychloride and the temperature raised to approximately 80 degrees. 108 parts (1.35 moles) of stabilized sulfur trioxide were admitted over a 2 hour period as the temperature rose to 125 degrees.

After heating overnight at a temperature not exceeding 170 degrees under reflux, the reaction mixture was cooled and a very slight amount of naphthalene was recovered by steam distillation. Acetone was added to just dissolve the brown gum present in the reaction flask and the whole was cooled to give material which, upon drying, was a glassy solid identified as dinaphthyl sulfone. 230 parts (0.775 moles) of diphenyl sulfone was obtained, a yield naphthalene consumed.

EXAMPLE 11

742 g. of o-xylene (7 moles) were agitated at a temperture of between about 50 and 60 degrees while a mixture of 380 g. (4.8 moles) liquid sulfur trioxide and 124 g. (0.8 moles) phosphorus oxychloride were rapidly added. While continuing to agitate the mixture, the temperature was raised to about 155 to 160 degrees under reflux and the reaction was permitted to run for 2 hours. The molten mixture was then poured into water and unreacted xylene was removed by azeotropic distillation. The reaction batch was then filtered, water washed and dried. 548 g. of product was obtained, a yield of 63% based on xylene consumed, which contained 85% of 3,3',4,4'-tetramethyl diphenyl sulfone.

EXAMPLE 12

10 moles of toluene, 6 moles of stabilized sulfur trioxide and 1 mole of phosphorus oxychloride were mixed with agitation. The temperature of the batch after all the ingredients were added was about 95 degrees. The temperature of the reaction mixture was raised to about 145 degrees while agitation was continued and the reaction was allowed to continue at this temperature under reflux overnight. The procedure of Example 1 was used to separate the sulfone product. A yield of 89% crude sulfone product based on the phosphorus oxychloride was obtained, 66% of which was the desired 4,4'-ditolyl sulfone isomer.

What is claimed is:

1. A method for the preparation of diaryl sulfones which comprises reacting (a) an aryl compound having the formula RH where R represents an aryl hydrocarbon compound in which the nuclear carbon atoms have their outer valences satisfied by hydrogen or substituents selected from the group alkyl, $C_1$–$C_5$ alkoxy and thioalkyl, chlorine, bromine, phenyl, substituted phenyl, phenoxy and substituted phenoxy in which the substituents in the phenyl and phenoxy are alkyl, $C_1$–$C_5$ alkoxy and thioalkyl, chlorine and bromine, with the proviso that where R is polynuclear aryl hydrocarbon the substituents thereon may also be nitro groups, in the presence of at least about 0.04 moles, per mole of the hereafter recited sulfonating agent, of a non-metallic condensing agent selected from the group consisting of $P_2O_5$, polyphosphoric acids, pentavalent phosphorus halides, phosphorus trichloride, phosphorus tribromide, boric anhydride and thionyl chloride, with (b) an essentially anhydrous sulfonating agent selected from the group consisting of sulfur trioxide and chlorosulfonic acid and mixtures thereof.

2. A method for the preparation of diaryl sulfones which comprises reacting (a) an aryl compound selected from the group consisting of benzene, monochlorobenzene, toluene, o-xylene and naphthalene, in the presence of at least about 0.04 moles, per mole of the hereafter recited sulfonating agent, of a non-metallic condensing agent selected from the group consisting of $P_2O_5$, polyphosphoric acids, pentavalent phosphorus halides, phosphorus trichloride, phosphorus tribromide, boric anhydride and thionyl chloride, with (b) an essentially anhydrous sulfonating agent selected from the group consisting of sulfur trioxide and chlorosulfonic acid and mixtures thereof.

3. A method according to claim 2, wherein between about 0.1 and 0.4 moles of said condensing agent per mole of said sulfonating agent are utilized.

4. A method according to claim 3, wherein between about 1.3 and 1.8 moles of said aryl compound per mole of said sulfonating agent are reacted.

5. A method according to claim 4, wherein said condensing agent is phosphorus oxychloride and said reaction is carried out at elevated temperatures.

References Cited
UNITED STATES PATENTS

| | | | |
|---|---|---|---|
| 2,833,826 | 5/1958 | Jarboe | 260—607 |
| 3,125,604 | 3/1964 | Robbins | 260—607 |

CHARLES B. PARKER, Primary Examiner

D. R. PHILLIPS, Assistant Examiner

U.S. Cl. X.R.

260—609